US008095648B2

(12) United States Patent
MacLeod et al.

(10) Patent No.: US 8,095,648 B2
(45) Date of Patent: Jan. 10, 2012

(54) NETWORK DEVICE INFORMATION COLLECTION AND ANALYSIS

(75) Inventors: Stewart P. MacLeod, Woodinville, WA (US); Felix W. Wong, Bellevue, WA (US); Gilbert Wong, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 431 days.

(21) Appl. No.: 11/959,466

(22) Filed: Dec. 19, 2007

(65) Prior Publication Data

US 2009/0164495 A1   Jun. 25, 2009

(51) Int. Cl.
*G06F 15/173* (2006.01)
(52) U.S. Cl. .................. 709/224; 709/223; 707/E17.044
(58) Field of Classification Search .................. 709/224, 709/223; 717/168; 706/50; 707/E17.044; 370/254
See application file for complete search history.

(56) References Cited

U.S. PATENT DOCUMENTS

| | | | |
|---|---|---|---|
| 6,170,065 B1 | 1/2001 | Kobata et al. | |
| 6,332,217 B1 | 12/2001 | Hastings | |
| 6,847,982 B2 | 1/2005 | Parker et al. | |
| 7,490,073 B1 * | 2/2009 | Qureshi et al. .................. | 706/50 |
| 2001/0056386 A1 | 12/2001 | O'Halloran et al. | |
| 2002/0083077 A1 | 6/2002 | Vardi | |
| 2003/0023516 A1 | 1/2003 | Sharrow et al. | |
| 2005/0138157 A1 | 6/2005 | Jung et al. | |
| 2005/0160421 A1 | 7/2005 | Bluvshteyn et al. | |
| 2006/0130046 A1 * | 6/2006 | O'Neill .......................... | 717/168 |
| 2006/0217823 A1 | 9/2006 | Hussey | |
| 2006/0248328 A1 | 11/2006 | Iszlai et al. | |
| 2007/0088630 A1 | 4/2007 | MacLeod et al. | |
| 2008/0049644 A1 * | 2/2008 | Halbert .......................... | 370/254 |

FOREIGN PATENT DOCUMENTS

WO    0205184 A3    1/2002

OTHER PUBLICATIONS

"BMC Topology Discovery", retrieved at <http://documents.bmc.com/products/documents/64/64/66464/66464.pdf> on May 11, 2007, 2 pages.
"Everest Network Audit & Management", retrieved at <http://www.raxco.be/pages/info/Everest/everestpro.pdf> on May 11, 2007, 2 pages.

* cited by examiner

*Primary Examiner* — Kyung H Shin

(57) ABSTRACT

Method and system for collecting network device information is provided. A meta-meta model structure is used by a plurality of collectors that collect information from a plurality of network devices. The meta-meta model identifies a network protocol that is used for data collection, identifies the type of information that is to be collected and also identifies how collected data is to be stored in a database. A plurality of collectors is configured to interface with the database. When data needs to be collected, an inventory engine reads the meta-meta model and instantiates a collector to collect and store information in the database as specified by the meta-meta model.

18 Claims, 11 Drawing Sheets

| Column Name | Column Description |
| --- | --- |
| Collector_id | Uniquely identifies each collector |
| Collector_type | Defines the Collector type, e.g.:<br>• 1 – Entity Collector<br>• 2 – Attribute Collector |
| Status | Collector Status<br>• 0 – Failed<br>• 1 - Success |
| Description | This field describes the collector |
| Last_watermark | This watermark value identifies which network device was last inventoried (i.e for which data was collected) |
| Last_timestamp | The time stamp value is used to determine which row has been updated |
| Start_time | Collection start date/time |
| End_time | Collection end date/time |

315 — (table)

316 — Collector_id
317 — Collector_type
318 — Status
319 — Description
320 — Last_watermark
321 — Last_timestamp
322 — Start_time
323 — End_time

Figure 3D

| Collector Identifier 324 | Class Identifier 325 | Class Name 326 | Class name space 327 | Collector Class Query 328 | Collector Stored Procedure 329 | Collector Table 330 |
|---|---|---|---|---|---|---|
| Unique Identifier Value for a collector | Identifier to identify a class | Identifies the name of a class | Identifies the name space of a class | Identifies how data is collected | Identifies a stored procedure for a collector | Identifies a collector table |

| Collector Identifier 332 | Class Identifier 333 | Attribute Identifier 334 | Attribute Name 335 | Destination Data type 336 | Source Data Type 337 | Need Date Conversion 338 |
|---|---|---|---|---|---|---|
| Unique Identifier Value for a collector | Identifier to identify a class | Identifies an attribute | Provides attribute name | Identifies Destination data type | Identifies Source data type | Indicates if Date conversion is needed |
| CCxxxx | 9ED15xx | 092cfxx | Total Physical Memory | Bigint | Null | Null |

NETWORK DEVICE INFORMATION COLLECTION AND ANALYSIS

RELATED ART

In computer networks today, computing systems commonly interact and interface with various network devices that operate in different environments, using various protocols. To manage computer networks, it is desirable to efficiently collect information regarding the hardware and software used by these network devices. Network device management and data collection continues to be a challenge in the computer networking arena.

SUMMARY

In one embodiment, a method and system for collecting network device information is provided. A meta-meta model structure is used by a plurality of collectors that collect information from a plurality of network devices. The meta-meta model for each collector identifies a network protocol that is used for data collection, identifies the type of information that is to be collected and also identifies how collected data is to be stored in a database. A plurality of collectors is configured to interface with the database. When data needs to be collected, an inventory engine reads the meta-meta model and instantiates a collector to collect and store information in the database as specified by the meta-meta model.

This brief summary has been provided so that the nature of the disclosure may be understood quickly. A more complete understanding of the disclosure can be obtained by reference to the following detailed description of the preferred embodiments thereof in connection with the accompanying drawings.

BRIEF DESCRIPTION OF THE DRAWINGS

The foregoing features and other features of the present disclosure will now be described with reference to the drawings of various embodiments. In the drawings, the same components have the same reference numerals. The illustrated embodiments are intended to illustrate, but not to limit the scope of the disclosure. The drawings include the following Figures:

FIG. 3D shows an example of a collector table used for collecting information, according to one embodiment;

FIG. 3E shows an example of a database table used for creating a meta-meta model, according to one embodiment;

FIG. 3F shows an example of a table for storing collected data, according to one embodiment;

DETAILED DESCRIPTION

Figure 1:
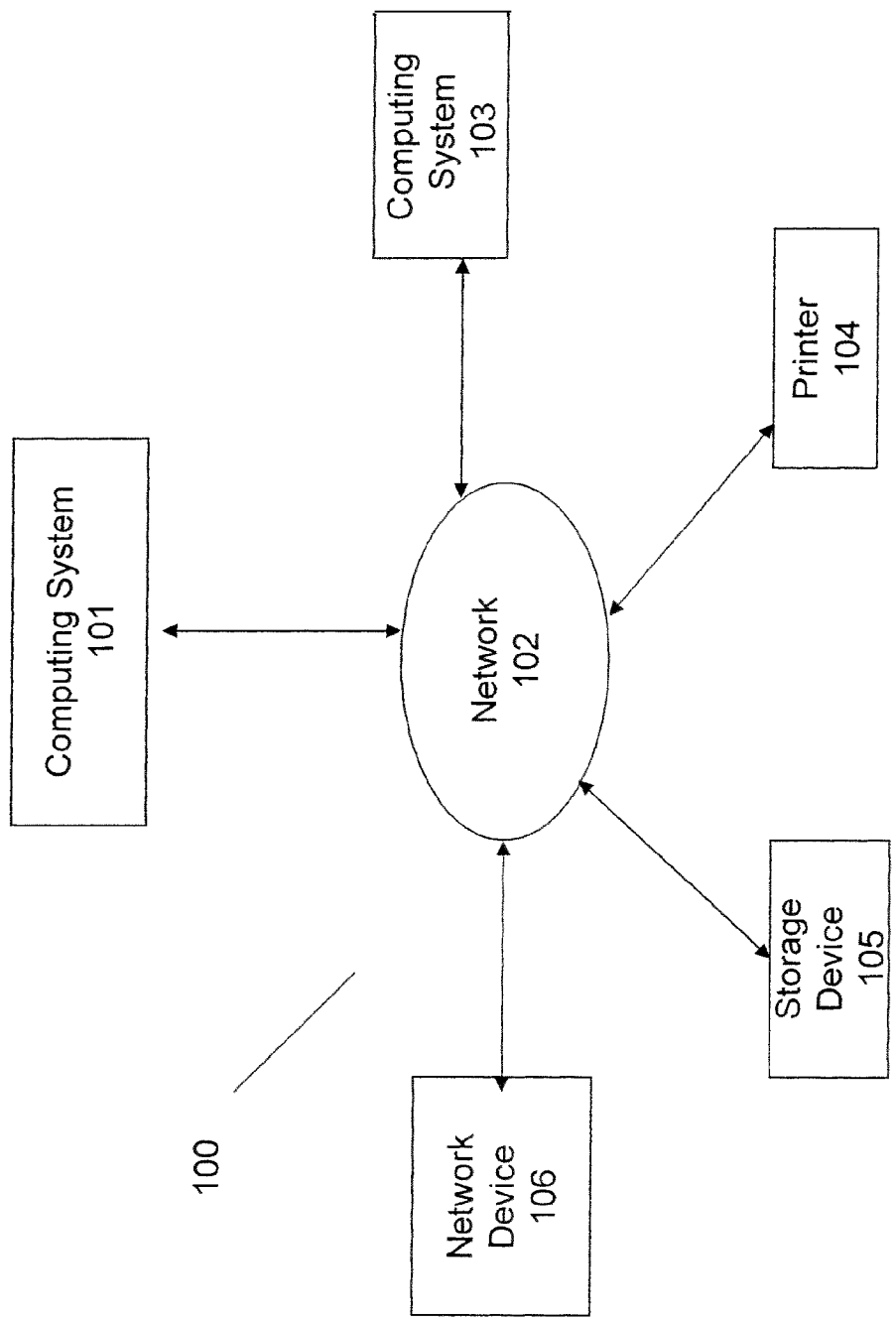
FIG. 1 shows a block diagram of a network system, according to one embodiment.

Definitions:

The following definitions are provided as they are typically (but not exclusively) used in the network computing environment, implementing the various adaptive embodiments described herein.

"Active Directory" ("AD") means a software component, typically of an operating system, for providing network directory services. A network directory may provide a listing of a plurality of network devices. Examples of AD include, without limitation, "Edirectory" function used in Novell® based networks, and iPlanet used in Solaris® based network (from Sun Microsystems Inc.) AD may be used for authentication, authorization, and configuration of devices supported by an Operating System (for example, the Windows Server 2003 Operating System and Windows XP Operating System provided by Microsoft Corporation (Windows is a registered trademark of Microsoft Corporation in the United States and other countries). AD provides a hierarchical data storage structure for objects in a network, including computers, printers, scanners, and others.

"Agent" means software code that is executed at a first network device (a target device (for example, a network printer)) to facilitate network communication with a second network device (for example, a computer server) for collecting information regarding the hardware and software of the first network device.

"Attribute Information" means information that describes an attribute of a network device. The term attribute is used herein with respect to entity and class information that are defined below. For example, attribute information for a network printer may include information that identifies a type of printer cartridge, IP address of the printer or any other attribute of the printer.

"Class" means an element of an entity. An entity may include a plurality of classes. For example, the entity "Network Printer" may include different "class" of printers (for example, "laser printers" "inkjet printers" and others) and each class may have a plurality of attributes that are defined by attribute information.

"Collector" means executable code or a module that is used to collect information from a networked device.

"Configuration Information" means entity and attribute information for a network device. For example, configuration information may include a device name, IP (Internet Protocol) address for a device and a listing of software applications that may be installed at a network device (or used by a network device).

"Entity Information" means any information that identifies a type of network device. An entity may include one or more classes. For example, entity information may be an instance that identifies "network printers" and the entity network printers in turn may include one or more class of printers.

"Inventory" means a listing of network devices and their configuration information.

"Meta-meta model" means a hierarchical software structure that may be used by a collector to collect network device information, according to one embodiment. The meta-meta model may provide the identity of a network device, nature and type of information that is to be collected and the protocol that is used to collect the information. The meta-meta model may include a first layer to identify a network protocol that may be used to collect network device configuration information. In another layer, the meta-meta model may include entity/class information that identifies the device whose information is to be collected. In yet another layer, the meta-meta model may also include attribute information for each class i.e. what type of information is to be collected for the identified device/class. For example, if entity/class information identifies a network computer, then attribute information may include information regarding, for example, a monitor, network interface card, modem, video card, memory, and IP address of the network computer. The information for a meta-meta model may be stored in one or more database tables. The stored information is used to identify how and what information is to be collected for a network device, i.e. network device information collection is "data driven".

"Network Device" (or "Networked Device") means a device that operates in a computer network and may include a computer, a printer, a scanner, a copier, or any other device that may communicate via a network connection.

"Watermark" means a marker that denotes the most current version for a parameter value, variable value, or command. In one embodiment, a watermark may be used in a database to describe the last collected entry for a network device.

To facilitate an understanding of the various embodiments, the general architecture and operation of a network system will first be described. The specific architecture and operation of the various embodiments will then be described with reference to the general architecture.

As used in this disclosure, the terms "component" "module", "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

In one embodiment, a system and method is provided for collecting network device information using a meta-meta model. Multiple collectors using a plurality of network protocols simultaneously collect data for a plurality of network devices. The collected data may be stored in the same database. Data collection may be triggered by timestamp/watermark values stored in database records as described below.

Network System

FIG. 1 shows a top-level block diagram of a network system 100 where a computing system 101 may communicate with various devices and systems via network 102. For example, computing system 101 may communicate with a network printer 104, a storage device 105, a network device 106 and another computing system 103. Devices 104-106 and computing system 103 are jointly referred to as "network devices" (or "networked devices") throughout this specification. Network system 100 is used to illustrate the various embodiments disclosed herein but is not intended to limit the scope of this disclosure.

Different network protocols may be used by computing system 101 to acquire (or discover) configuration information regarding network devices 103-106. Network protocols include LDAP, SNMP, Windows® based Networking Protocols, SCM (Service Control Manager), SOAP and others that are described below.

LDAP (Lightweight Directory Access Protocol) includes a set of standard protocols for accessing information directories. LDAP is based on standards contained within the X.500 standard (an ISO and ITU standard that defines how global directories should be structured), but unlike some implementations of X.500, LDAP supports TCP/IP.

SCM (Service Control Manager) is a network protocol that is commonly used in network communication. The SCM protocol is typically used for pre-Windows NT operating system era devices.

SOAP (Simple Object Access Protocol) is an XML-based messaging protocol used to encode information in Web service requests and response messages before sending them over a network. SOAP messages are independent of any operating system or protocol and may be transported using a variety of Internet protocols, including SMTP (Short Mail Transfer Protocol), MIME (Multi Purpose Internet Mail Extensions) and HTTP (Hyper Text Transfer Protocol).

SNMP (Simple Network Management Protocol) is a network protocol that may be used for managing networks, for example, to identify IP addressable network devices including routers, switches and others using standard SNMP management information base (MIBs).

WMI (Windows Management Instrumentation) is an implementation and extension of the standard Common Information Model (CIM) technology in a Windows® based operating environment. WMI is used to collect hardware and software inventory and operating system information from network devices.

Figure 2:
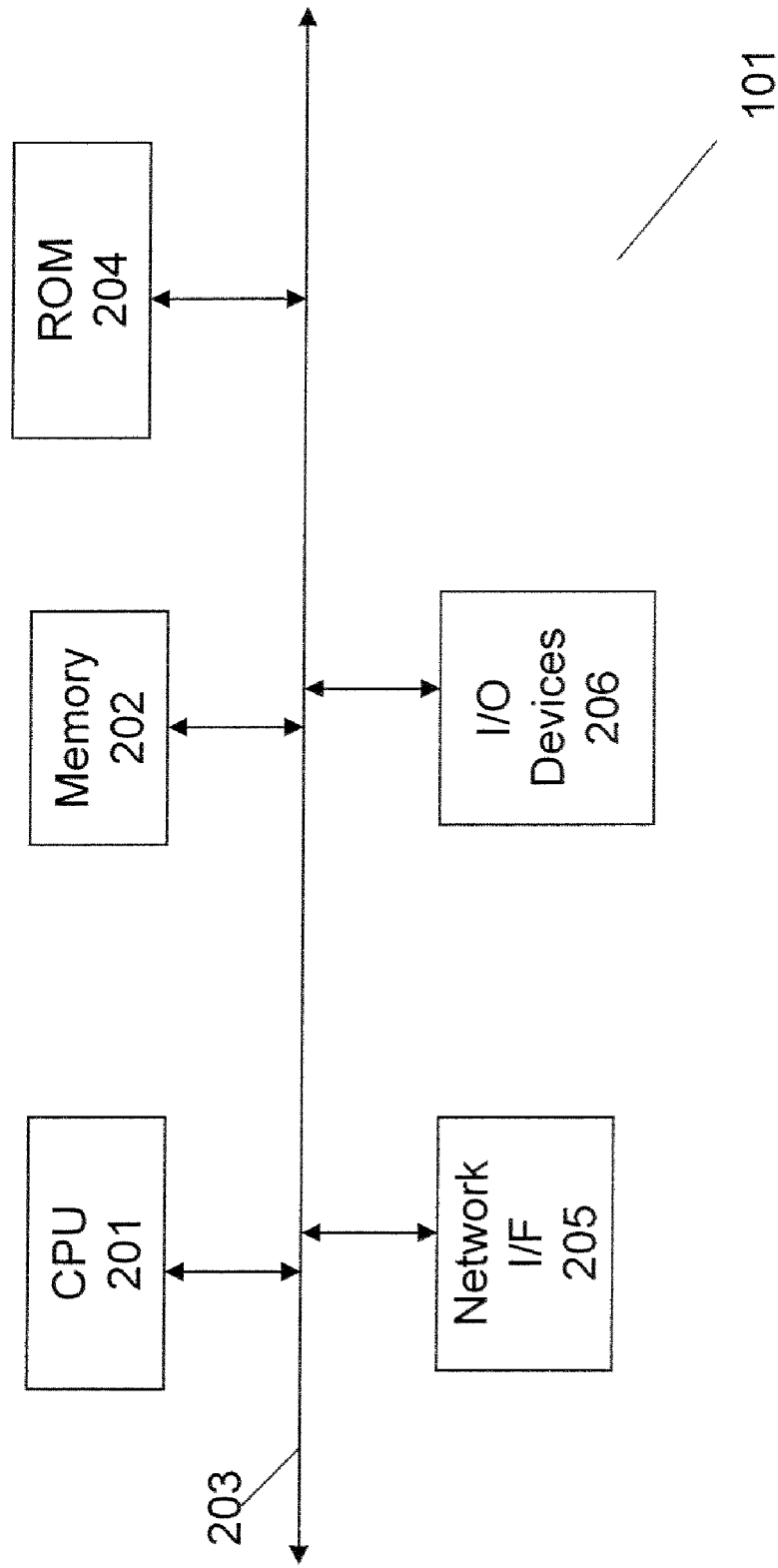
FIG. 2 shows a block diagram of the architecture of a computing system used in the system of FIG. 1.

FIG. 2 shows a block diagram of computing system 101 that may be used for implementing the various embodiments disclosed herein. The example of FIG. 2 is to illustrate one possible system to implement the embodiments disclosed herein and is not to be construed to limit the disclosed embodiments.

Computing system 101 may include a central processing unit ("CPU") (or microprocessor) 201 connected to a system bus 203. Non-volatile memory (for example, random access main memory ("RAM")) 202 provides CPU 201 with access to memory storage. When executing program instructions, CPU 201 stores those process steps in memory 202 and executes the stored process steps out of memory 202.

Computing system 101 connects to network 102 via network interface 205 (shown as Network I/F 205). Network 102 may be any network, including the Internet that allows computing system 101 to download applications, code, documents and other electronic information.

Read only memory ("ROM") 204 is provided to store invariant instruction sequences such as start-up instruction sequences or basic Input/output operating system (BIOS) sequences.

Input/Output ("I/O") devices 206, for example, a keyboard, a pointing device ("mouse"), a monitor and the like may also be provided depending on how computing system 101 is used.

Collection System

In one embodiment, a system for collecting network device information using a plurality of network protocols is provided. The collected information may be used to establish relationships between entities, hardware and software components, both at a physical and logical level. Multiple inventory engines may be used to collect information and the collected information may be integrated and stored in a centralized database.

A meta-meta model may be used to collect information. The meta-meta model is created for each collector and network device information is collected based on the information stored for the meta-meta model. The information for the meta-meta model may be stored in one or more database tables.

In one embodiment, the system allows one to efficiently collect information for a plurality of network devices using disparate network protocols. The integrated data allows one to identify similar or dissimilar components, for example, understanding that Domain Name System (DNS) Host Name and ComputerName (using Active Directory) refers to the same thing.

Figure 3A:
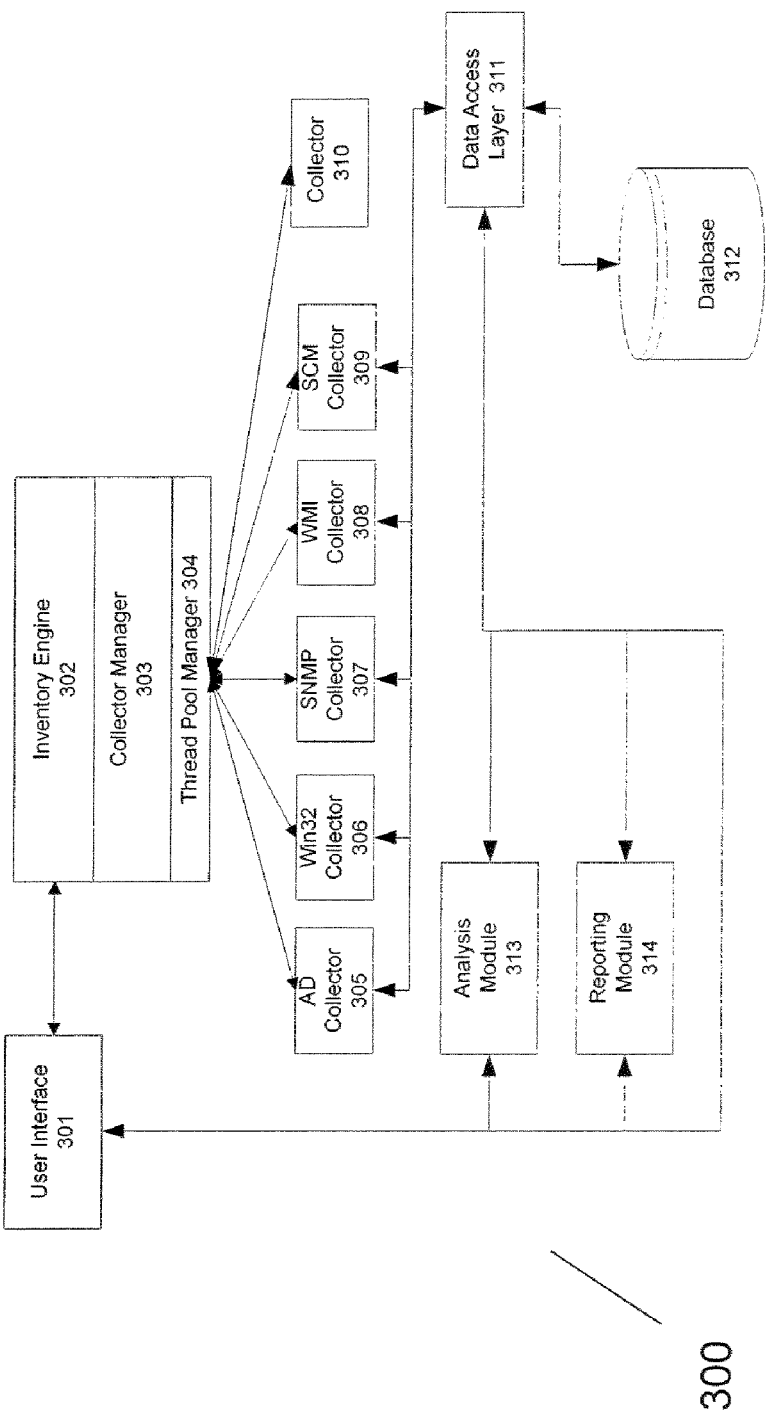
FIG. 3A is a block diagram of a system for collecting network device information using a meta-meta model, according to one embodiment.

FIG. 3A shows a block diagram of a system 300 for collecting and analyzing network device information, according to one embodiment. System 300 may be used to collect configuration information for network devices 103-106. A meta-meta model may be used by system 300 for example, to determine what type of data is to be collected, how the data is to be collected (i.e. what type of protocol should be used), and how and where collected data should be stored.

System 300 is flexible and adaptive because when data collection parameters or network environments change (for example, if a new network protocol is used or a network protocol is updated), then a user simply has to change (or create a new model) the meta-meta model to collect network device information without any significant agent code change/update in target devices.

System 300 includes a user interface 301 that may be used to configure and set-up other system 300 components as described below. In one embodiment, user interface 301 provides a wizard for setting up inventory collectors (also referred to as data collectors or collectors) for collecting information regarding networked devices. The wizard may receive various inputs from a user, including without limitation, customer (i.e. user) information, network domain name, type of network device or any other information.

A network administrator may use user interface 301 to specify information that is to be collected for a particular network by setting up a meta-meta model for a collector. For example, an IT professional (or system administrator) may plug a laptop into a customer's network and employ the wizard of user interface 301 to set up system 300. User interface 301 facilitates the use and set-up of the meta-meta model that is described in more detail below.

System 300 may also include an inventory engine 302 that controls overall data collection in a multi-threaded or multi-process environment where data may be simultaneously collected by a plurality of collectors, as described below. Inventory engine 302 may include a collector manager 303 and a thread pool manager 304.

Collector manager 303 may also be configured via user interface 301. Collector manager 303 manages a plurality of collectors 305-310 that are described below. In one embodiment, collector manager 303 may use thread pool manager 304 to start and manage collection threads for simultaneous data collection by collectors 305-310.

Collector manager 303 controls overall data collection schedule, i.e. collector manager 303 schedules when each collector may collect network device information based on a meta-meta model for each of the collectors. Collector manager 303 also stores collected network device information in database 312 that is described below. The meta-meta model may be used to determine where data should be stored.

In one embodiment, different collector types may be used to collect network device information. A first collector type may be designated as an "entity collector" to collect entity information; and a second collector may be designated as an "attribute collector" to collect attributes information. Entity collectors and attribute collectors may operate in parallel.

Figure 3B:
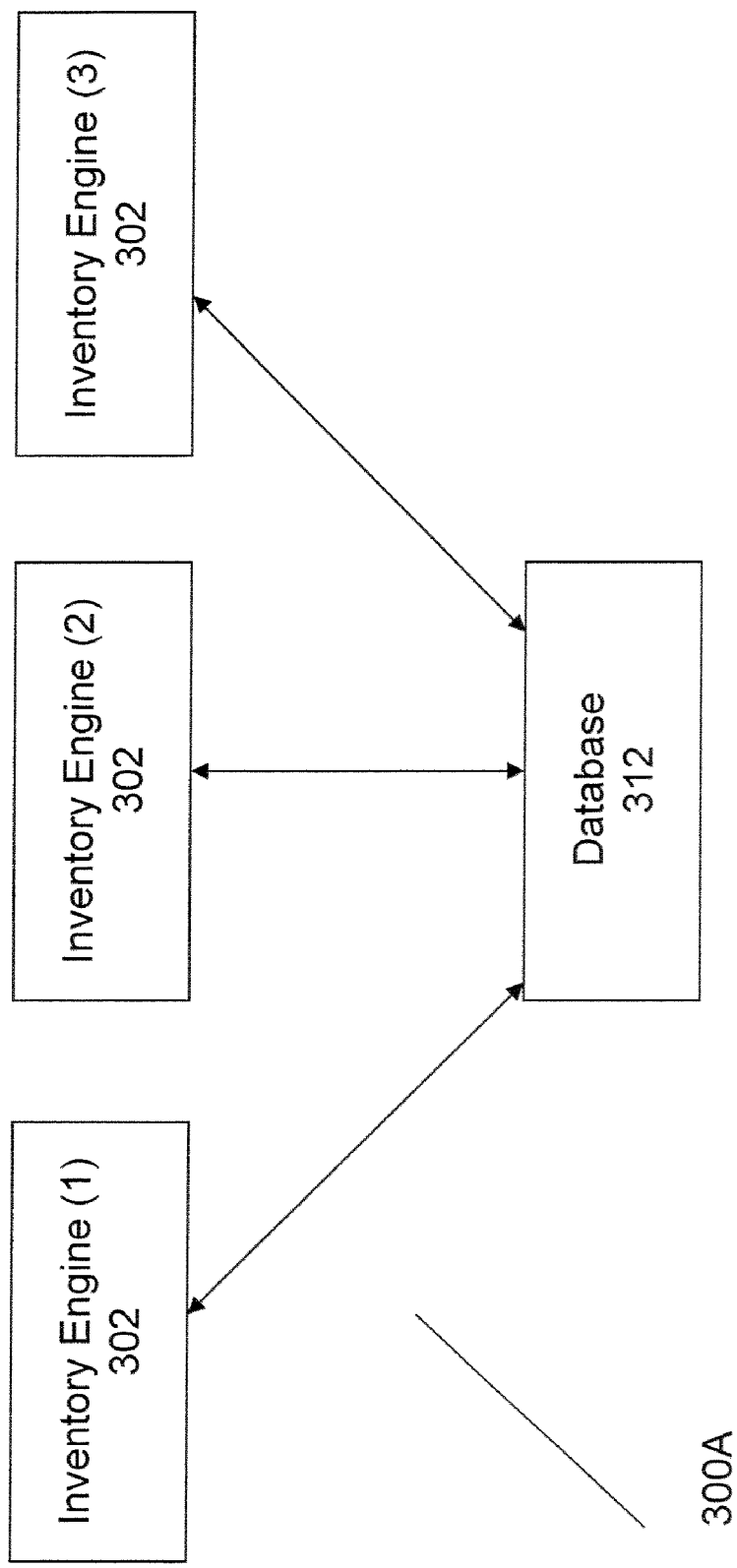
FIG. 3B shows a system diagram for using a plurality of inventory engines, according to one embodiment.
Figure 3C:
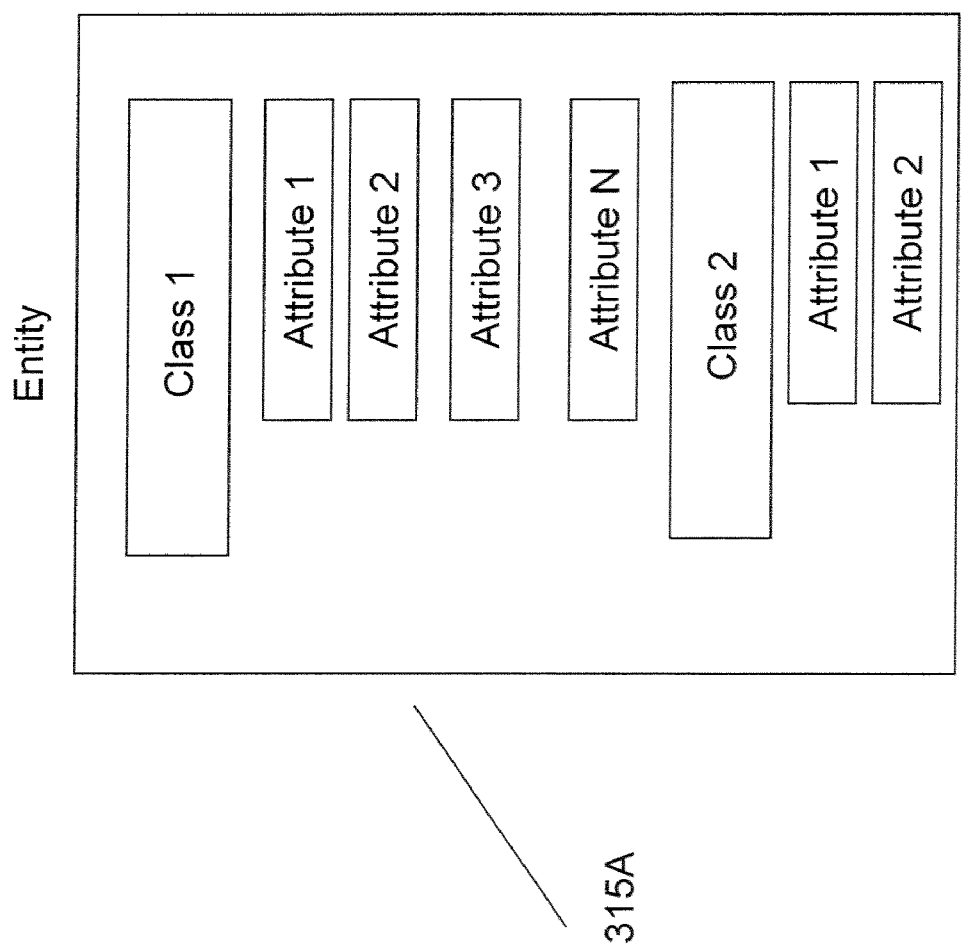
FIG. 3C shows a block diagram showing the relationship between an entity, class and attribute, according to one embodiment.

FIG. 3C shows an example of a hierarchical structure 315A for the entity and attribute collectors. As stated above, an entity may include one or more classes and each class may include one or more attributes. For example, if an entity is "networked printer", then Class 1 may be inkjet printers with a plurality of attributes (for example, type of inkjet printer, printer name, memory and others) and Class 2 may be a laser printer with other attributes.

An entity collector collects basic information (or a first level of network device configuration information) for networked devices 103-106, for example, an entity collector may obtain the identity of a network device. An attribute collector collects detail information (or a second level of network device configuration information) for a network device hardware and software. For example, as shown in FIG. 3A and described below, AD (active directory) collector 305 and Win32 collector 306 may operate as entity collectors, while SNMP collector 307, WMI (Windows Management Instrumentation) collector 308 and SCM (service control manager) collector 309 may operate as attribute collectors.

AD collector 305 is used when network directory services are available in a network system. In one embodiment, AD collector 305 issues queries for a network device to collect network device identity information. The type of inquiry issued by AD collector 305 depends on the type of protocol. For example, if the LDAP protocol is used, then AD collector 305 generates LDAP compliant queries to obtain network device identification information.

Win32 collector 306 may be used to enumerate a list of network devices in network systems using a Windows® based operating system. Win32 collector 306 may scan network subnets without using any specific credentials (i.e. login password or any other security measures) to obtain the list of networked devices. Win32 collector 306 may also obtain network domain information for the network devices. The term network domain as used herein means a "workgroup" of authorized networked devices that can communicate with each other. The network domain may be created by a user and/or a system administrator.

Attribute collectors may include different collector types, for example, SNMP collector 307, WMI collector 308 and SCM collector 309. After AD collector 305 and Win32 collector 306 collect the first level information regarding networked devices 103-106, WMI collector 308 may collect hardware and software related information; and operating system configuration information of the networked devices.

SNMP collector 307 is used to collect information for network devices using SNMP as the network protocol. SNMP collector 307 may be used to identify IP addressable network devices such as routers, switches, and firewalls using standard SNMP protocol management information base (MIB) objects and to gather information about the network devices. SNMP collector 307 may also be used to identify operating systems.

WMI collector 308 communicates with individual network devices to obtain hardware and software configuration information. The extent and type of information that is collected by WMI collector 308 may be programmed by a user via user interface 301. Collected information includes information regarding basic input/output system (BIOS), memory, processor, inventory of software used by a system, network configuration and others. WMI collector 308 may use a credential map (as described below) to verify proper credentials before data collection starts for a particular thread.

To collect information, a user may specify a credential type for each network device and/or a domain. The credential type may be used to define the level of security that may be needed to access device information. For example, in one instance, a user login identifier with a password may be enough to access device information. In another instance, higher credential level may be used, for example, a cipher key in conjunction with user login identifier and password may be used to access network device information. A credential map (i.e. a listing of authorized users) may be used to restrict access to network device information.

SCM collector 309 communicates with a remote computer/device using the Service Control Manager protocol to enumerate services running on the remote computer.

For convenience, the foregoing adaptive aspects of the present disclosure are illustrated using different collector types (i.e. entity and attribute). However, the present disclosure is not limited to entity and attribute collectors. In another embodiment, a single collector 310 may be used to collect both entity and attribute information.

System 300 includes database 312 that may store information collected by the plurality of collectors using a plurality of network protocols, as described above. In one embodiment, database 312 is a centralized database that may be shared by a plurality of inventory engines 302 executed in different computing systems, as shown in System 300A of FIG. 3B. The plurality of inventory engines 302 collect information from a plurality of devices and the collected information is stored in database 312.

Database 312 may also store the meta-meta model information and stored procedures for collecting information, as described below.

Database 312 may store one or more tables that are used to define the meta-meta model and the collectors for collection information. For example, FIG. 3D shows a collector table 315 that may be used to store information regarding plural collectors. FIG. 3E shows a database table 331 that establishes a relationship between classes, how data is collected and stored procedures for each collector. FIG. 3F shows an example of how collected data may be stored in table 339. The various tables of FIGS. 3D-3F are now described below in detail.

Referring to FIG. 3D, collector table 315 is used by collector manager 303 to collect information. Row 316 of collector table 315 may provide an identifier for each collector in system 300. Row 317 specifies the collector type, namely, entity or attribute collector. Row 318 is used to indicate whether a previous collection attempt by a collector was successful or a failure. Row 319 of collector table 315 stores a brief description for the collector.

Row 320 stores a water mark value that identifies which network device was last inventoried (i.e. for which data was collected). The watermark may be used to distribute work items between the plurality of inventory engines 302 (FIG. 3B).

Row 321 shows a time stamp value, which indicates the latest "row" of collected information that has been updated. The row of collected information is shown in Table 339 (FIG. 3F).

Row 322 stores the collection start time and row 323 stores the collection end time for a collector.

Table 331 shown in FIG. 3E may be used to build a meta-meta model for collecting network device information. Table 331 has a plurality of columns 324-330. Column 324 identifies a collector. Column 325 identifies a particular class for which data is collected, while column 326 identifies a class name and column 327 identifies a class name space. Column 328 identifies how data is collected for a class. Column 329 identifies a stored procedure for a collector and column 330 identifies a collector table (for example, a collector table 315, FIG. 3D).

The plural fields in table 331 allow a collector to collect specific information based on stored procedures.

FIG. 3F shows an example of Table 339 that is populated after data is collected by one or more collectors of System 300. Table 339 may have a plurality of columns. For example, column 332 stores the collector identifier; column 333 stores a class identifier; column 334 identifies the collected attribute information, while column 335 identifies an attribute name. Column 336 identifies how data is collected, while column 337 identifies the collected data type. Column 338 identifies if the collected data needs to be converted.

Table 339 includes a plurality of rows of collected information. Time stamp value shown in FIG. 3D (321) indicates when a row has been updated.

The tables described in FIGS. 3D-3F have only been used to illustrate the adaptive aspects of the present disclosure. The tables may have fewer or more fields. For example, table 339 of FIG. 3F may also store the destination data length, source data length and parsing parameters for the stored procedures. Furthermore, the tables of FIGS. 3D-3F may be integrated into one or more tables.

Referring back to FIG. 3A, in one embodiment, data access layer 311 of system 300 facilitates communication between the plurality of collectors 305-310, analysis module 313 and database 312. In another embodiment, collectors 305-310 and analysis module 313 may directly communicate with database 312.

Analysis module 313 downloads the latest network device information from database 312, analyzes network device configuration and may generate recommendations. A user using user interface 301 may program and store a procedure in database 312 for analysis module 313. The stored procedure may specify the type of information that analysis module 313 may obtain and the type of analysis that analysis module 313 may perform using the obtained information. The recommendations are based on the type of analysis performed by analysis module 313. For example, a user may create a stored procedure for analysis module 313 to analyze usage of networked storage devices. If a storage device is almost full, then analysis module 313 may notify a user of the storage device that may be almost full and recommend another storage device that may have more storage space.

System 300 further includes a reporting module 314, which is used to generate reports after network device information is collected and analyzed by analysis module 313. A user using user interface 301 may customize reports based on user preferences. The user may specify the type of information that the user needs, report format, report frequency and other parameters. For example, a user may want to know how many printers are on line at a given time. Reporting module 314 may create a report that provides the printer information.

Reporting module 314, depending on user need and choice, may generate a report in a plurality of formats, for example, word-processing, spread sheet and others.

Figure 3G:
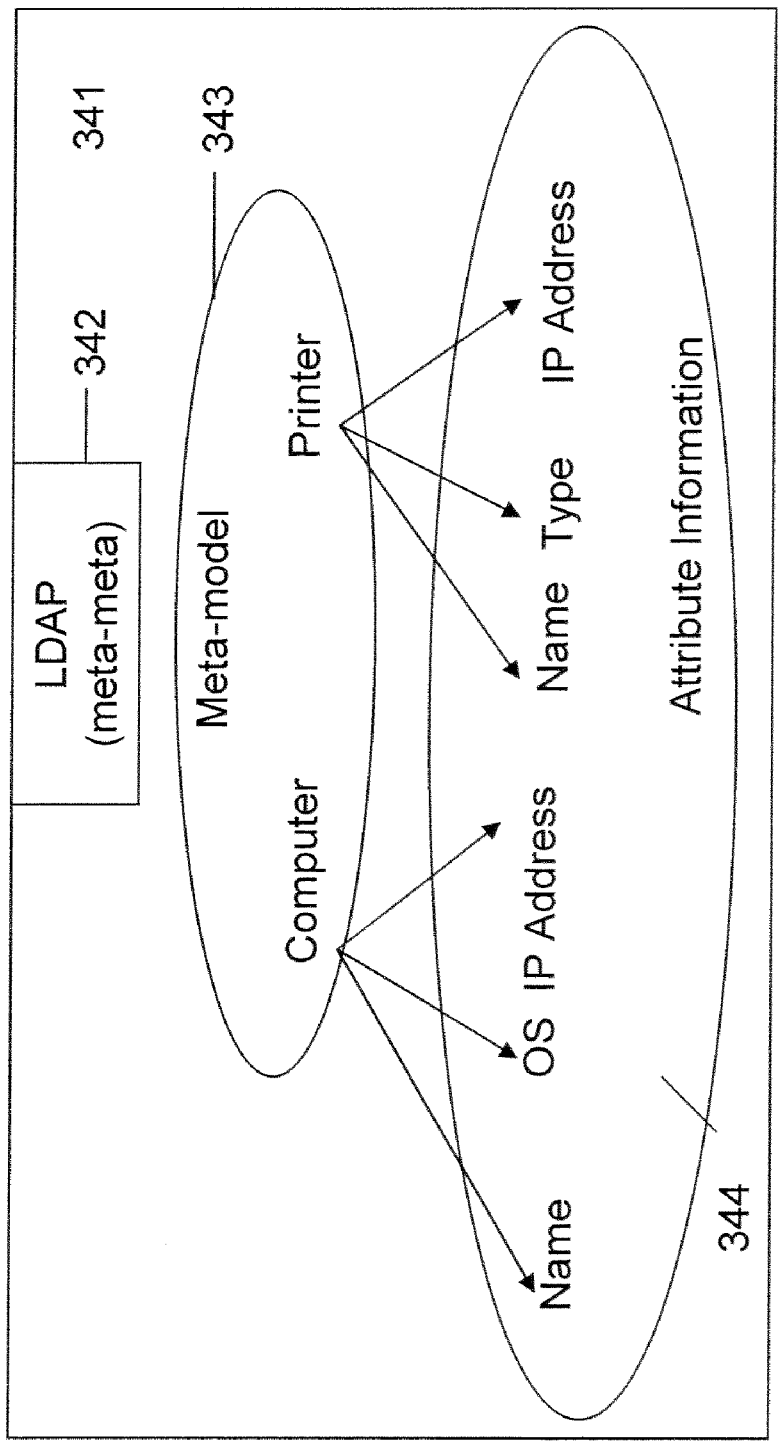
FIG. 3G shows an example of a meta-meta model, according one embodiment.

FIG. 3G shows an example of the hierarchical structure of meta-meta model 341. The highest layer (or segment) 342 (maybe referred to as the meta-meta layer) in model 341 includes the network protocol that is used for data collection. In this example, the network protocol is LDAP. If the network protocol changes, then one can update the highest layer to accommodate protocol change.

The next layer 343 in the meta-meta model 341 may be referred to as the "meta model layer" which stores each device identifier (i.e. entity/class information). In this example, the device identifiers are shown as "Computer" and "Printer". The next layer (or instance) 344 is the model layer that stores attribute information for the "meta model layer" 343. In this example, layer 344 stores the computer name, the operating system (OS), the IP Address for "Computer"; and the printer name, the printer type and printer IP address for "Printer". The adaptive aspects described herein are not limited to any particular type of entry, number of entries in meta-meta model 341, protocol type or any other parameter.

The meta-meta model allows one to customize data collection because a user can define what information is to be collected and what network protocol (for example, LDAP, SOAP, SNMP and others) is to be used for data collection. The collectors using these different network protocols may simultaneously collect network device information. The collected information may be stored in the same database 312.

Furthermore, if a new protocol is introduced, then the user only has to set up a meta-meta model for the new protocol using an existing table stored in database 312. The user does not have to update target agent code to collect information using the new protocol.

Figure 3H:
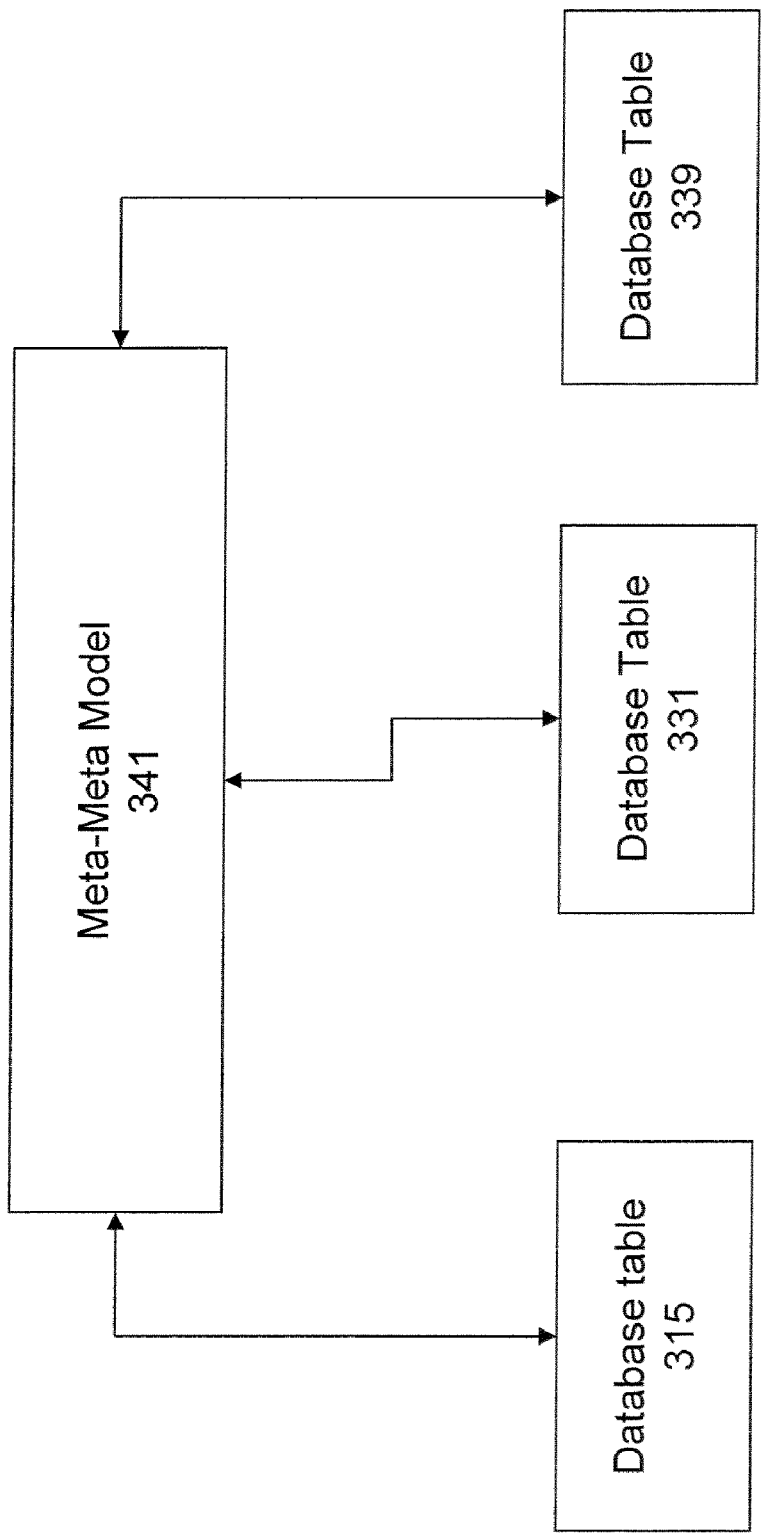
FIG. 3H shows an example of building a meta-meta model using a plurality of database tables.

FIG. 3H shows an example of how a plurality of database tables may be used to create a meta-meta model 341. In this example, tables 315, 331 and 339 may be used to build meta-meta model 341.

Figure 4:
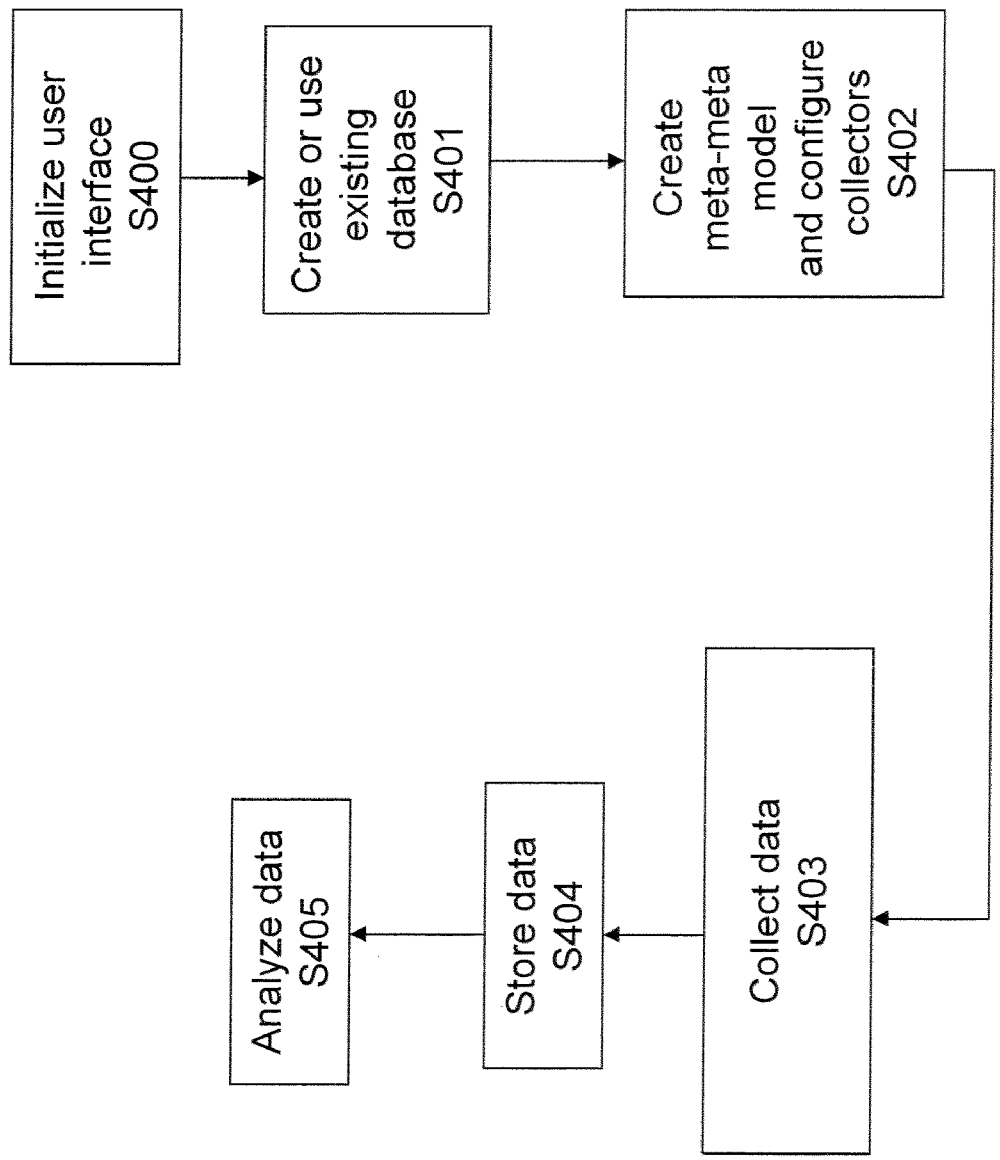
FIG. 4 shows a process flow diagram for using a meta-meta model, according to one embodiment.

Process Flow:

FIG. 4 shows a process flow diagram, for collecting network device information, using a meta-meta model, according to one embodiment. For clarity sake, the process steps of FIG. 4 are described below with respect to system 300 of FIG. 3, however, the process steps are not limited to being used only with System 300.

The process starts in step S400, when a user interface (for example, user interface 301) is initialized to configure a data collection system (for example, System 300 of FIG. 3).

In step S401, the user creates a database or loads an existing database (for example, 312).

During initial configuration (step S402), a plurality of collectors (for example, 305-310) are configured and set up by a user. The user creates a meta-meta model (or updates an existing meta-meta model) for collecting network device information. As described above, the meta-meta model information is stored in database 312 and network device information is collected based on the stored meta-meta model information, enabling "data driven" inventory collection.

In one embodiment, a wizard like user interface 301 may be used to configure the collectors. The user answers various questions for the wizard, for example, the user selects collection methods, defines collection parameters, and input network device credentials. The user may also inputs basic information for a plurality of networked devices (for example, type of device, name of the device and others).

After the meta-meta model is setup and stored in database 312, in step S403, data collection begins. Inventory engine 302 reads the meta-meta model to determine what type of network protocol should be used to collect data and what information is to be collected. Collector managers 303 may instantiate both entity collectors and attribute collectors for collecting network device information. Entity collectors (for example, AD collector 305 and Win32 collector 306) collect entity information and return that information to collector manager 303. Attribute collectors (for example, SNMP collector 307, WMI collector 308 and SCM collector 309) collect network device attribute information (or level two network device configuration information).

In step S404, collector manager 303 stores the collected information in database 312. The meta-meta model is used to determine how and where collected data should be stored. For example, when collected data is about a physical memory device, the model tells the inventory engine 302 that collected data should be written to a database table called "memory" and memory size should be written in a column labeled "size".

In step S405, analysis module 313 analyzes the collected information. As described above, the type of analysis depends on network and user needs. For example, a user may want to know the type of storage that is being used in a network. After the data for various storage devices is collected, analysis module 313 may analyze the collected information and report the information to the user. Reporting module 314 may be used to report the analyzed information to the user.

In one embodiment, the meta-meta model based approach is flexible, because as data collection environment and data collection needs change, one can modify the meta-meta model to accommodate those changes. As new protocols and type of collectors emanate, one may define a meta-meta model for the new collector/protocol at the server end without having to update or install agent code in various target devices.

In another embodiment, the meta-meta model allows one to customize data collection because a user can define what information is to be collected and what network protocol (for example, LDAP, SOAP, SNMP and others) is to be used for data collection.

In yet another embodiment, a meta-meta model is provided that is used by a collector manager module to collect information regarding networked devices based on the information stored within the model itself, i.e. data collection is "data-driven". The meta-meta model is multi-tiered and stores information regarding a network protocol, entity and attributes regarding the entity. A relationship between the entities is created and maintained within a database.

In another embodiment, multiple collectors using different protocols may be used to collect network device information. The collected data itself is stored in a centralized database. This makes the system scalable because as new protocols emanate, a collector may be defined and configured by creating a meta-meta model and the collected data is integrated within the centralized database.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A system for collecting information from a plurality of network devices, comprising:

a collector manager module, at least partially implemented in hardware, that interfaces with a plurality of collectors that are configured to collect information, using a plurality of respective network protocols, from the plurality of network devices, each of the plurality of collectors being configured to collect data based on a respective meta-meta model that specifies the respective network protocol to be used by that collector and the collected information is stored in a database, the plurality of collectors including a plurality of entity collectors and a plurality of attribute collectors, each of the plurality of collectors being either an entity collector or an attribute collector, the plurality of entity collectors being configured to collect a first level of information from the plurality of network devices that identifies a plurality of types of the plurality of respective network devices and the plurality of attribute collectors being configured to collect a second level of information from the plurality of network devices that describes one or more attributes including an IP address of each of the plurality of network devices, at least one attribute collector of the plurality of attribute collectors being configured to use a credential map to verify proper credentials before data collection starts for a thread.

2. The system of claim 1, wherein the meta-meta model for each of the plurality of collectors is stored in the database.

3. The system of claim 1, wherein the first level of information includes an identifier to identify a network device.

4. The system of claim 1, wherein the second level of information includes configuration information for hardware and software of a network device.

5. The system of claim 1, wherein a time stamp value stored in the database is used by the collection manager module to determine if information for a network device is to be collected.

6. The system of claim 1, wherein the meta-meta model is a layered structure that identifies a network protocol in a meta-meta layer; identifies an entity in a meta layer and identifies a plurality of attributes in a model layer.

7. The system of claim 1, wherein a plurality of collector managers executed at a plurality of computing systems are used to store collected information in the database.

8. The system of claim 1, wherein the meta-meta model enables data driven collection of the information from the plurality of network devices.

9. The system of claim 1, wherein the meta-meta model is a layered structure that identifies a network protocol in a meta-meta layer; identifies an entity in a meta layer and identifies a plurality of attributes in a model layer.

10. A method for collecting information from a plurality of network devices, comprising:

configuring a plurality of collectors by creating a meta-meta model for each collector of the plurality of collectors, the meta-meta model for each collector of the plurality of collectors at least identifies a respective network protocol of a plurality of network protocols in a meta-meta layer to be used by that collector to collect network device information, identifies an entity in a meta layer and identifies at least one attribute in a model layer, the meta-meta model for each respective collector of the plurality of collectors being used by an inventory engine to determine what information is to be collected for the plurality of network devices and the respective network protocol that is to be used by that collector to collect the information;

initializing the plurality of collectors to include a plurality of entity collectors for collecting a first level of network device information from the plurality of network devices that identifies a plurality of types of the plurality of respective network devices and a plurality of attribute collectors for collecting a second level of network device information from the plurality of network devices that describes one or more attributes including an IP address of each of the plurality of network devices, each of the plurality of collectors being either an entity collector or an attribute collector, the plurality of collectors being configured to simultaneously collect information using the plurality of respective network protocols; and configuring each of at least one attribute collector of the plurality of attribute collectors to use a credential map to verify proper credentials before that attribute collector starts data collection for a thread.

11. The method of claim 10, wherein the first level of information includes an identifier to identify a network device.

12. The method of claim 10, wherein the second level of information includes configuration information for hardware and software of a network device.

13. The method of claim 10, wherein a time stamp value stored in a database is used by a collection manager module to determine if information for a network device is to be collected.

14. The method of claim 13, wherein a plurality of collector managers executed at a plurality of computing systems are used to store collected information in the database.

15. A network system, comprising:

a computing system, at least partially implemented in hardware, coupled to a plurality of network devices via a network link, the computing system executing code for a collector manager module that interfaces with a plurality of collectors that are configured to collect information, using a plurality of respective network protocols, from the plurality of network devices, each of the plurality of collectors being configured to collect data based on a respective meta-meta model that specifies the respective network protocol to be used by that collector and the collected information is stored in a database, the plurality of collectors including a plurality of entity collectors and a plurality of attribute collectors, each of the plurality of collectors being either an entity collector or an attribute collector, the plurality of entity collectors being configured to collect entity information from the plurality of network devices and the plurality of attribute collectors being configured to collect attribute information from the plurality of network devices, the entity information identifying a plurality of types of the plurality of respective network devices, the attribute information describing one or more attributes including an IP address of each of the plurality of network devices, at least one attribute collector of the plurality of attribute collectors being configured to use a credential map to verify proper credentials before data collection starts for a thread.

16. The system of claim 15, wherein a plurality of collector managers executed at a plurality of computing systems are used to store collected information in the database.

17. The system of claim 15, wherein the meta-meta model enables data driven collection of the information from the plurality of network devices.

18. The system of claim 15, wherein a time stamp value stored in the database is used by the collection manager module to determine if information for a network device is to be collected.

* * * * *